July 21, 1931.  E. W. LARSEN  1,815,264

SUPPORTING DEVICE

Filed March 25, 1929

Inventor:
Einer W. Larsen
by

Patented July 21, 1931

1,815,264

UNITED STATES PATENT OFFICE

EINER WILLIAM LARSEN, OF CHICAGO, ILLINOIS, ASSIGNOR TO WESTERN ELECTRIC COMPANY, INCORPORATED, OF NEW YORK, N. Y., A CORPORATION OF NEW YORK

SUPPORTING DEVICE

Application filed March 25, 1929. Serial No. 349,579.

This invention relates to supporting devices, and more particularly to a device for supporting rotatable objects.

An object of the invention is to provide an improved locking device of simple and economical construction for removably securing a rotatable object upon a supporting arbor.

In accordance with the general features of the invention, there is provided in one embodiment thereof a spool supporting arbor having a removable member threaded upon an externally threaded end portion thereof for securing the spool against an annular flange spaced from the end of the arbor. The threaded member is automatically locked in position upon the arbor by a spring pressed ratchet key longitudinally movable in a slot formed in the arbor and adapted to engage ratchet teeth formed on the inner side of the threaded member.

Figure 1:
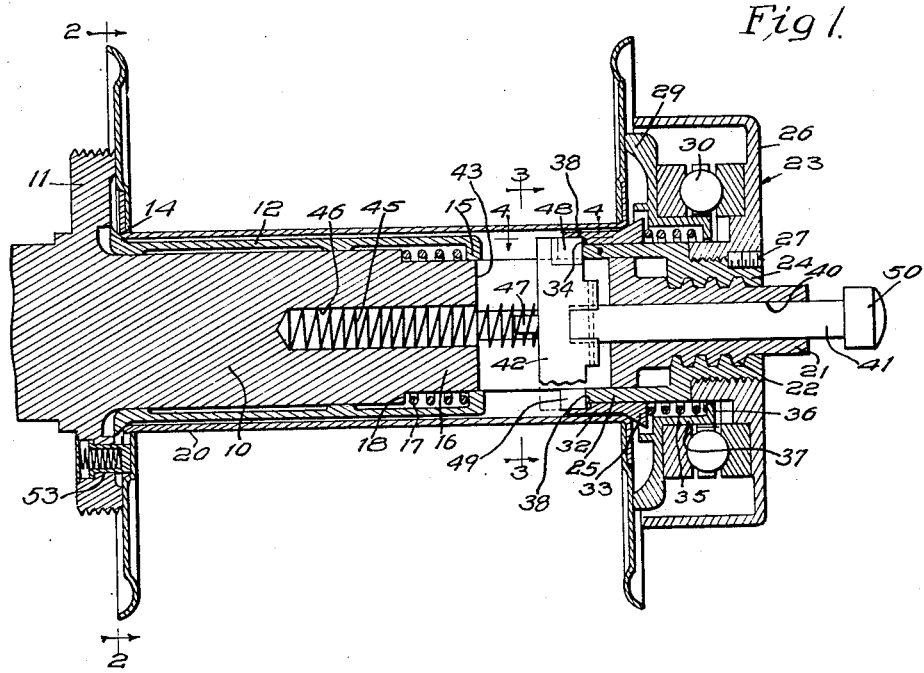
Figure 2:
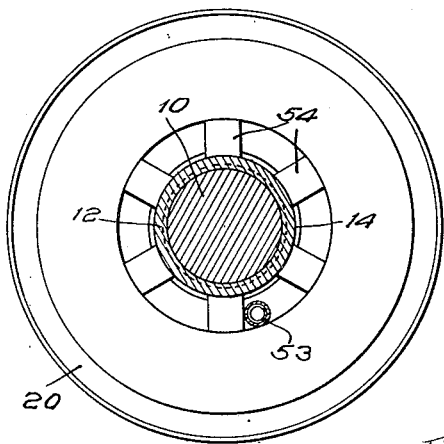
Figure 3:
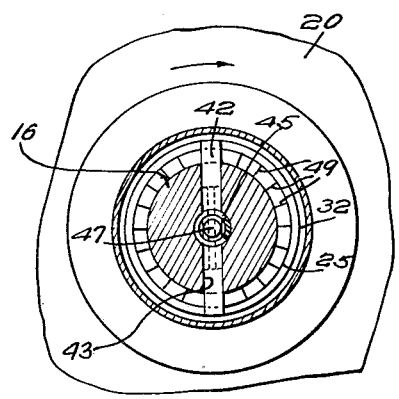
Figure 4:
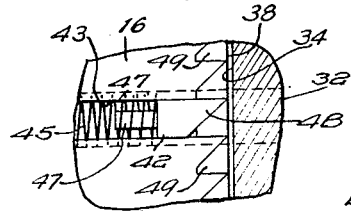

A more complete understanding of the invention will be had from the following detailed description of a specific embodiment thereof, reference being had to the accompanying drawings, wherein Fig. 1 is a longitudinal sectional view of a spool supporting arbor embodying the features of the invention, Fig. 2 is a transverse section taken on line 2—2 of Fig. 1, and Figs. 3 and 4 are fragmentary detailed sections taken on lines 3—3 and 4—4 respectively of Fig. 1.

Referring now to the drawings in detail, wherein like reference numerals designate corresponding parts throughout the several views, it will be observed that a supporting arbor, indicated generally by the reference numeral 10, is provided near its inner end with an annular flange 11. A sleeve 12 is loosely carried upon the arbor 10 and is provided at its end adjacent to the flange 11 with an externally tapered flange 14. The opposite end of the sleeve 12 is internally flanged as indicated at 15 and loosely engages a reduced central portion 16 of the arbor. A compression spring 17 is interposed between the internal flange 15 of the sleeve 12 and a shoulder 18 formed by the reduced central portion 16 of the arbor.

The arbor is provided with a reduced end portion 21 which is externally threaded as indicated at 22 to receive a spool retaining member indicated generally by the reference numeral 23. The threads 22 are preferably doubled and relatively coarse so that the member 23 may be quickly threaded in position. The member 23 comprises an inner sleeve 24 having an outer substantially cup shaped casing 26 threaded thereto and locked against displacement by means of a screw 27. The inner sleeve 24 is internally threaded to accommodate the externally threaded end portion 21 of the arbor. An extended portion 25 of the sleeve 24 fits loosely around the central portion 16 of the arbor. Mounted within the casing 26 is a disk 29 which is preferably spaced from the inner wall of the casing by a ball bearing 30 or other suitable friction reducing means.

An outer sleeve 32 is loosely carried upon the extended portion 25 of the inner sleeve 24. This outer sleeve is externally tapered at one end, as indicated at 33, and is internally recessed at its opposite end, as indicated at 34. A compression spring 35 interposed between the end of the outer sleeve 32 and an inwardly projecting flange 36 formed upon an extended hub portion 37 of the disk 29, serves to normally hold the sleeve 32 against an external flange 38 formed upon the end of the extended portion 25 of the inner sleeve 24. It will be understood that the spool retaining member 23 is a self-contained unit comprising the outer casing 26, the internally threaded inner sleeve 24, the disk 29, and the outer sleeve 32.

Slidably mounted in a longitudinal slot 43 formed in the central portion 16 of the arbor is a key member 42 having a pair of oppositely disposed teeth 48 adapted to engage ratchet type teeth 49 formed on the inner end of the extended portion 25 of the inner sleeve 24. A compression spring 45 mounted in a central longitudinal aperture 46 of the arbor serves to normally hold the key member 42 in locking engagement with diametrically opposed teeth 49 of the inner sleeve 24, whereby the spool retaining member 23 is securely locked to the arbor. The outer end of the spring 45 encircles a pin 47 secured to or formed integral with the key member 42. A pin 41 is slidably mounted in a central longitudinal aperture 40 formed in the reduced end portion 21 of the arbor. The pin 41 is attached, at its inner end, to the key member 42 and its outer end projects from the end of the arbor and is provided with a suitable knob 50 whereby it may be conveniently pressed inwardly against the pressure of the spring 45 to disengage the member 42 from the ratchet teeth 49. It will be apparent that by holding the key member 42 in its disengaged position, as just described, the spool retaining member 23 may readily be unthreaded from the arbor 10.

In employing the improved device for supporting a spool 20, the member 23 is removed and the spool 20 is inserted over the sleeve 12, the latter fitting loosely within the bore of the spool, as shown in Fig. 1. The member 23 is then threaded upon the end of the arbor, the ratchet teeth 48 of the key member 42 riding in and out over the ratchet teeth 49 (Fig. 4) in a well known manner. The member 23 is turned until the spool is firmly clamped between the flange 11 and the disk 29, whereupon the member 23 is automatically locked in position by the engagement of the spring pressed key member 42 with diametrically opposed ratchet teeth 49, as hereinbefore described. The spool retaining member 23 is thus positively locked to the arbor thereby preventing accidental displacement of the spool.

It will be apparent that the externally tapered end portions 14 and 33 of the spring pressed sleeves 12 and 32, respectively, serve to accurately center the spool upon the arbor and also compensate for slight variations in the bores of the spools. If desired, the spool may be positively driven with the supporting arbor by means of a spring pressed driving pin 53 projecting inwardly from the flange 11 and adapted to engage one of a plurality of extended and bent over end portions 54 of the hub or drum of the spool.

When it is desired to remove the spool from the supporting arbor, the pin 41 is pressed inwardly, thereby disengaging the key member 42 from the ratchet teeth 49 whereupon the member 23 may readily be unthreaded from the arbor.

It is to be understood that the embodiment of the invention herein illustrated and described is merely a convenient and useful form of the invention which is capable of numerous other applications within the scope of the appended claims.

What is claimed is:

1. In a device for removably supporting a rotatable object, a support, a member threaded upon the support and engaging the object for preventing displacement of the object with respect to the support, a spring pressed member carried by the support and engaging the side of the threaded member adjacent to the object for automatically locking the threaded member to the support, and means for disengaging the spring pressed member to permit the removal of the threaded member.

2. In a device for removably securing a rotatable object upon a supporting arbor, a member threaded upon the arbor and engaging the object for preventing accidental displacement of the object with respect to the arbor, a spring pressed key carried by the arbor and movable longitudinally thereof into engagement with the inner side of the threaded member for locking the threaded member to the arbor, and a pin slidable in the arbor for disengaging the key to permit the removal of the threaded member.

3. In a device for removably securing a spool upon a rotatable supporting arbor having a spool supporting portion, a member threaded upon an end of the arbor for engaging a head of the spool to prevent accidental displacement thereof, and means mounted within the spool supporting portion of the arbor for automatically locking the threaded member to the arbor.

4. In a device for removably securing a spool upon a rotatable supporting arbor having a longitudinal slot therein, a spool retaining member threaded upon an end of the arbor for preventing longitudinal displacement of the spool, and a spring pressed key movable in the longitudinal slot of the arbor for engaging the inner side of the spool retaining member to lock said member to the arbor.

5. In a device for removably securing a spool upon a rotatable supporting arbor having a longitudinal slot therein, a spool retaining member threaded upon an end of the arbor for engaging a head of the spool to prevent longitudinal displacement of the spool, a spring pressed member movable in the longitudinal slot of the arbor for engaging the inner side of the spool retaining member to lock said member to the arbor, and a pin attached to the spring pressed member and slidable in the arbor for disengaging the spring pressed member to permit the removal of the spool retaining member.

6. In a device for removably supporting a spool upon a supporting arbor having a longitudinal slot therein, a toothed spool retaining member threaded upon an end of the arbor for preventing longitudinal displacement of the spool, and a spring pressed member movable in the longitudinal slot of the arbor for engaging the teeth on the inner side of the spool retaining member to lock said member to the arbor.

In witness whereof, I hereunto subscribe my name this 16 day of March, A. D. 1929.

EINER WILLIAM LARSEN.